(12) United States Patent
Eom et al.

(10) Patent No.: US 11,109,337 B2
(45) Date of Patent: Aug. 31, 2021

(54) METHOD FOR ESTIMATING ARRIVAL TIME OF WIRELESS COMMUNICATION SIGNAL AND COMPUTER-READABLE RECORDING MEDIUM RECORDING SAME

(71) Applicant: VILLIV MICRON INC., Seongnam-si (KR)

(72) Inventors: Jae Hong Eom, Songpa-gu Seoul (KR); Yunho Jung, Gyeonggi-do (KR); Jeonghyeon Cheon, Gyeonggi-do (KR); Hyunsu Hwang, Gyeonggi-do (KR)

(73) Assignee: VILLIV MICRON INC.

(*) Notice: Subject to any disclaimer, the term of this patent is extended or adjusted under 35 U.S.C. 154(b) by 411 days.

(21) Appl. No.: 16/061,643

(22) PCT Filed: Jan. 21, 2016

(86) PCT No.: PCT/KR2016/000654
§ 371 (c)(1),
(2) Date: Jun. 12, 2018

(87) PCT Pub. No.: WO2017/122855
PCT Pub. Date: Jul. 20, 2017

(65) Prior Publication Data
US 2020/0267678 A1   Aug. 20, 2020

(30) Foreign Application Priority Data
Jan. 13, 2016 (KR) .................. 10-2016-0004275

(51) Int. Cl.
*H04W 56/00* (2009.01)
(52) U.S. Cl.
CPC ... *H04W 56/0045* (2013.01); *H04W 56/0065* (2013.01)

(58) Field of Classification Search
None
See application file for complete search history.

(56) References Cited

U.S. PATENT DOCUMENTS 6,618,452 B1    9/2003   Huber et al. .................. 375/343
9,501,915 B1 *  11/2016  Laska ................... G06F 3/0482
(Continued)

FOREIGN PATENT DOCUMENTS

KR   20060096475   9/2006   .............. H04J 11/00
KR   20090034431   4/2009   .............. G01S 3/808
(Continued)

OTHER PUBLICATIONS

IEEE Standard for Local and metropolitan area networks—Part 15.4: Low-Rate Wireless Personal Area Networks (LR-WPANs), IEEE Std 802.15.4™-2011 (Revision of IEEE Std 802.15.4-2006) Sep. 5, 2011, pp. 219 and 220 (Year: 2011).*
(Continued)

*Primary Examiner* — Alex Skripnikov
(74) *Attorney, Agent, or Firm* — Hayes Soloway P.C.

(57) ABSTRACT

A method for estimating an arrival time of a wireless communication signal comprises the steps of: receiving a packet including a first preamble, a second preamble, and a start of frame delimiter (SFD) by a receiver; estimating, by the receiver, a first delay time on the basis of a time point of demodulating the SFD and the symbol length of the first preamble; and estimating, by the receiver, a second delay time on the basis of an accumulated correlation degree calculated by performing an accumulated correlation calculation on the second preamble.

17 Claims, 7 Drawing Sheets

(56) References Cited

U.S. PATENT DOCUMENTS

| | | | |
|---|---|---|---|
| 2011/0268155 A1 | 11/2011 | Oh et al. ............... | 375/130 |
| 2014/0016653 A1* | 1/2014 | Oh ............... | H04W 56/001 |
| | | | 370/474 |
| 2014/0266904 A1 | 9/2014 | Sendonaris et al. ....... | 342/385 |

FOREIGN PATENT DOCUMENTS

| | | | |
|---|---|---|---|
| KR | 20110063248 | 6/2011 | ............ H04W 24/02 |
| KR | 20150131020 | 11/2015 | ............ G01S 19/22 |
| WO | WO2008070671 | 6/2008 | ............ H04L 25/06 |

OTHER PUBLICATIONS

Cheon et al., "TOA Estimation Algorithm Based on Low Power Wireless Communication Systems", 2015 Conference of the Korea Navigation Institute, vol. 19, No. 1, pp. 108-110, Oct. 23, 2015 (legible text (3 pages) and English translation (12 pages)). (Year: 2015).*

International Search Report (w/translation) and Written Opinion (no translation) issued in application No. PCT/KR2016/000654, dated Oct. 5, 2016 (12 pgs).

Cheon et al., TOA Estimation Algorithm Based on Low Power Wireless Communication Systems (English Abstract only available), 2015 Conference of the Korea Navigation Institute, vol. 19, No. 1, pp. 108-110, Oct. 23, 2015 (3 pgs).

* cited by examiner

METHOD FOR ESTIMATING ARRIVAL TIME OF WIRELESS COMMUNICATION SIGNAL AND COMPUTER-READABLE RECORDING MEDIUM RECORDING SAME

TECHNICAL FIELD

Example embodiments relate to a method of estimating time of arrival (TOA) of a wireless communication signal, and more particularly, to a method of estimating an error within a sampling interval in TOA of a wireless communication signal and compensating for the error.

BACKGROUND ART

A recent development in wireless network technology has brought the advent of Internet of things (IoT) technology that enables searches for information through the Internet anywhere at any time and provides and applies new information using the retrieved information. As the IoT technology develops, interest in application services using positional information and research has thus been conducted into positioning technology and systems. For example, there is time of arrival (TOA)-based positioning technology that measures a distance based on an amount of time taken for a radio wave transmitted from a radio frequency (RF)-based transmitter to arrive at a receiver, and this technology is used to estimate a TOA in ZigBee, Wi-Fi, ultra-wideband (UWB) systems, and the like.

For various applications of the IoT technology, position estimation requires a high level of accuracy, in addition to restrictions for low power and low costs, based on a field of application. For example, a wireless communication system based on IEEE 805.15.4, a technical standard of the institute of electrical and electronics engineers (IEEE), is a low-power and low-cost communication system that is widely used in a ubiquitous sensor network (USN), and various methods have been devised for TOA estimation algorithms for such a system.

For example, there is a method of finding a reception time within a sample interval from a result of an autocorrelation function and a cross-correlation function. However, this method uses two correlation operators for the autocorrelation function and the cross-correlation function, and it is thus highly complicated to implement the method. For another example, there is a method of estimating a reception time within a sampling interval from a linear equation using correlation function result values at both left and right ends from a peak point of a cross-correlation function result value. However, this method may need to be improved further, although it is relatively simply implemented.

DISCLOSURE

Technical Solutions

According to an example embodiment, there is provided a method of estimating time of arrival (TOA) of a wireless communication signal, the method including receiving, by a receiver, a packet including a first preamble, a second preamble, and a start of frame delimiter (SFD), estimating, by the receiver, a first delay time based on an SFD demodulation time at which the SFD is demodulated and on a symbol length of the first preamble, and estimating, by the receiver, a second delay time based on a cumulative correlation calculated by performing a cumulative correlation operation on the second preamble.

The method may further include estimating a total delay time by adding the first delay time and the second delay time.

The estimating of the first delay time may include detecting a first count corresponding to the SFD demodulation time, detecting a second count corresponding to a reception time at which the packet is received by subtracting, from the first count, a count associated with the symbol length of the first preamble and a count associated with a symbol length of the SFD, and estimating the first delay time by multiplying the second count by a sampling period.

The estimating of the second delay time may include calculating the cumulative correlation using a result of accumulating a plurality of symbols at symbol intervals. The estimating of the second delay time may include estimating an error in a sampling interval using an average operation of the calculated cumulative correlation, and estimating the second delay time by multiplying the estimated error by a sampling period.

The estimating of the error may include detecting a peak point p at which the calculated cumulative correlation has a maximum value, and estimating a real peak point $p_r$ by dividing a sum $S_{CC}$ of products of the cumulative correlation and a sampling time by a sum $S_C$ of the cumulative correlation. The real peak point $p_r$ may be calculated using an equation, $$p_r = \frac{S_{CC}}{S_C} = \frac{\sum_{\mu=-m}^{m}(p+\mu)\cdot C(p+\mu)}{\sum_{\mu=-m}^{m} C(p+\mu)},$$

in which m denotes a size of an average operation interval.

According to another example embodiment, there is provided a method of estimating TOA of a wireless communication signal, the method including receiving, by a receiver, a packet including a first preamble, a second preamble, and an SFD, estimating, by the receiver, a first delay time based on a correlation calculated by performing a correlation operation on the packet at each sampling period, and to estimating, by the receiver, a second delay time based on a cumulative correlation calculated by performing a cumulative correlation operation on the second preamble.

The method may further include estimating a total delay time by adding the first delay time and the second delay time.

The estimating of the first delay time may include determining, to be a reception time at which the packet is received, a time at which the correlation calculated by performing the correlation operation on the packet is maximized.

The estimating of the second delay time may include calculating the cumulative correlation using a result of accumulating a plurality of symbols at symbol intervals. The estimating of the second delay time may include estimating an error in a sampling interval using an average operation of the calculated cumulative correlation, and estimating the second delay time by multiplying the estimated error by a sampling period.

The estimating of the error may include detecting a peak point p at which the calculated cumulative correlation has a maximum value, and estimating a real peak point $p_r$ by dividing a sum $S_{CC}$ of products of the cumulative correlation and a sampling time by a sum $S_C$ of the cumulative correlation.

BEST MODE FOR CARRYING OUT THE INVENTION

The following structural or functional descriptions are exemplary to merely describe example embodiments, and the scope of the example embodiments is not limited to the descriptions provided in the present disclosure. Various changes and modifications may be made thereto by those of ordinary skill in the art.

Although terms such as "first" or "second" are used herein to describe various components or elements, these components or elements are not to be limited by these terms. These terms should be used only to distinguish one component from another component. For example, a first component or element referred to in examples described herein may also be referred to as a second component or element without departing from the teachings of the examples.

It will be understood that when a component is referred to as being "connected to" another component, the component may be directly connected or coupled to the other component or intervening components may be present.

As used herein, the singular forms are intended to include the plural forms as well, unless the context clearly indicates otherwise. It should be further understood that the terms "comprises," "includes," and "has," when used in this disclosure, specify the presence of stated features, numbers, integers, steps, operations, members, elements, components, and/or combinations thereof, but do not preclude the presence or addition of one or more other features, numbers, integers, steps, operations, members, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings, wherein like reference numerals refer to the like elements throughout. However, a scope of right is not limited by these example embodiments.

Figure 1:
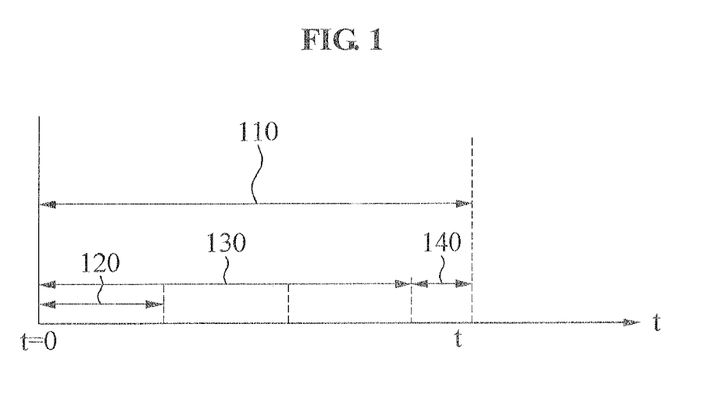
FIG. 1 is a graph illustrating an example of a method of estimating time of arrival (TOA) according to an example embodiment.

FIG. 1 is a graph illustrating an example of a method of estimating time of arrival (TOA) according to an example embodiment. Hereinafter, the method of estimating TOA will be simply referred to as a TOA estimating method. In the example illustrated in FIG. 1, a transmission time at which a packet is transmitted from a transmitter to a receiver is indicated by t=0, and a reception time at which the packet is received by the receiver is indicated by $t=t_1$. TOA refers to an amount of time taken for the packet transmitted from the transmitter to arrive at the receiver, and may thus be estimated by measuring a total delay time 110 from the transmission time to the reception time $t_1$.

Herein, TOA estimation may be performed using a predefined pattern, such as, a preamble. To determine an accurate reception time of a transmitted signal, a correlation between a received signal and a reference signal may be calculated at each sampling period 120, and at a point in time at which the correlation is maximized may be determined to be a reception time. When applying such a method to, for example, a wireless communication system with a bandwidth of 2 megahertz (MHz) and an oversampling factor (OSF) of 4, a TOA estimation result with a maximum error of ±18.25 meters (m) may be obtained. However, such a maximum error of ±18.25 m may not be accurate positional information in an application field, such as, for example, indoor positioning, and it may thus be needed to compensate for such an error by estimating TOA information within a sampling interval.

The TOA estimating method may be used to compensate for an error of a total TOA by additionally estimating a detailed delay time within a sampling interval while maintaining compatibility with a standard for a wireless communication system. This method suggested herein may be used to greatly improve positioning accuracy without increasing hardware complexity or power consumption.

As illustrated, the TOA estimating method estimates both a first delay time 130 as a sampling interval and a second delay time 140 within the sampling interval. Herein, the first delay time 130 may be an amount of time corresponding to an integer multiple of the sampling period 120, and the second delay time 140 may be an amount of time less than the sampling period 120. When the first delay time 130 and the second delay time 140 are estimated, the total delay time 110 may be estimated by adding the first delay time 130 and the second delay time 140.

Figure 2:
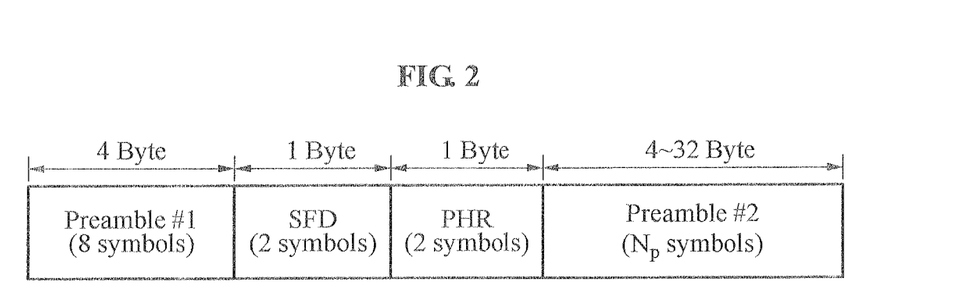
FIG. 2 is a diagram illustrating an example of a configuration of a packet for a method of estimating TOA according to an example embodiment.

FIG. 2 is a diagram illustrating an example of a configuration of a packet for a TOA estimating method according to an example embodiment. A configuration of a packet described herein according to an example embodiment is based on a general standard configuration of wireless communication, which is a physical layer protocol data unit (PPDU).

Referring to FIG. 2, a packet may include a first preamble in which a 0th symbol S0 is repeated eight times, a start of frame delimiter (SFD) indicating a start point of the packet, a physical layer (PHY) header (PHR), and a second preamble in which the 0th symbol S0 is repeated $N_p$ times. In the example, $N_p$ may be set to be 64. The second preamble may be defined to compensate for a TOA error within a sampling interval, and transmitted in a physical layer service data unit (PSDU) interval.

Figure 3:
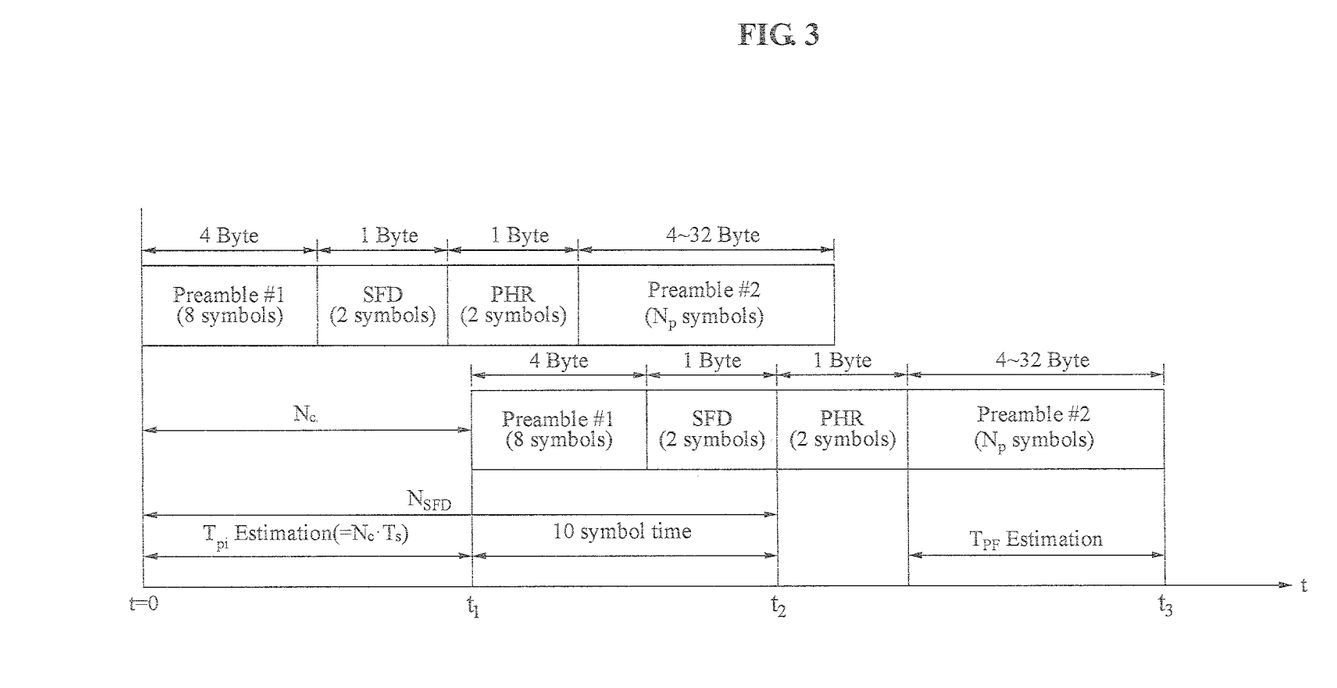
FIG. 3 is a diagram illustrating an example of a method of estimating TOA according to an example embodiment.

FIG. 3 is a diagram illustrating an example of a TOA estimating method according to an example embodiment. A packet illustrated in an upper portion of the diagram indicates a packet transmitted from a transmitter, and a packet illustrated in a lower portion of the diagram indicates a packet received by a receiver. According to an example embodiment, the TOA estimating method may estimate each of a first delay time $T_{pi}$ and a second delay time $T_{pf}$, and estimate a total delay time $T_{pt}$ by adding them.

To estimate the first delay time $T_{pi}$, the TOA estimating method may estimate a delay time from a transmission time (t=0) at which the packet is transmitted from the transmitter to an SFD demodulation time (t=$t_2$) at which an SFD is demodulated at the receiver. The TOA estimating method may detect a first count $N_{SFD}$ corresponding to the SFD demodulation time, and detect a second count $N_C$ corresponding to a reception time at which the packet is received by subtracting, from the first count $N_{SFD}$, a count associated with a symbol length of the first preamble and a count associated with a symbol length of the SFD. For example, in a case in which the symbol length of the first preamble is eight symbols and the symbol length of the SFD is two symbols, the second count $N_C$ may be detected by subtracting, from the first count $N_{SFD}$, a count corresponding to a length of the ten symbols. When the second count $N_C$ is detected, the first delay time $T_{pi}$ may be estimated by multiplying the second count $N_C$ by a sampling period $T_S$.

According to another example embodiment, the TOA estimating method may perform a correlation operation on the received packet to estimate the first delay time $T_{pi}$. For example, a correlation between the received packet and a reference signal may be calculated, and a point in time at which the correlation is maximized may be determined to be the reception time at which the packet is received.

The TOA estimating method may additionally estimate the second delay time $T_{pf}$ to compensate for a TOA error within a sampling interval. The estimating of the second delay time $T_{pf}$ will be described in greater detail with reference to FIG. 4.

Figure 4:
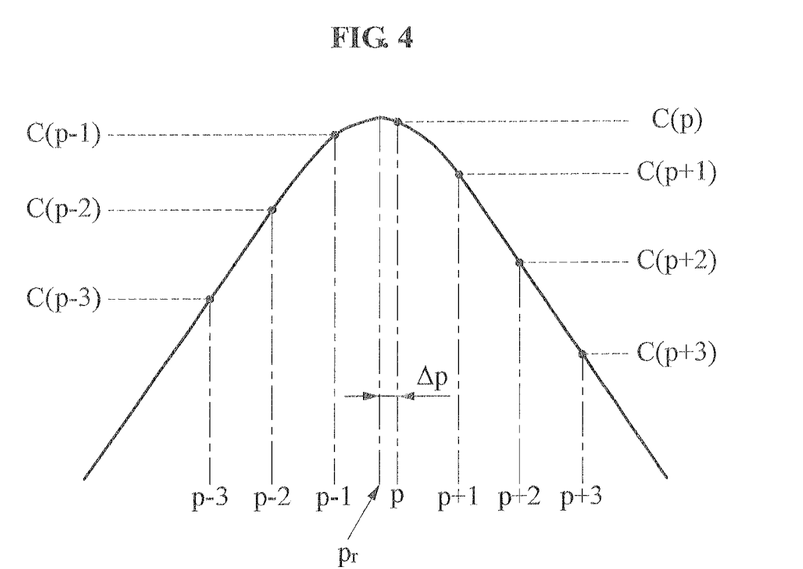
FIG. 4 is a graph illustrating an example of a correlation calculated through a method of estimating TOA according to an example embodiment.

FIG. 4 is a graph illustrating an example of a correlation calculated in a TOA estimating method according to an example embodiment. According to an example embodiment, a cumulative correlation operation may be used to estimate an accurate TOA by reducing an effect of additive white Gaussian noise (AWGN). For example, a second delay time $T_{pf}$ may be estimated based on a cumulative correlation calculated by performing a cumulative correlation operation on a second preamble in the example of FIG. 2.

In detail, the cumulative correlation operation may calculate a cumulative correlation with respect to the second preamble using a result of accumulating a plurality of symbols at symbol intervals. For example, the cumulative correlation may be calculated as represented by Equation 1, $$C(u) = \sum_{l=0}^{N_p-1} C_{DC}((N_s-1)l + u) \quad \text{[Equation 1]}$$

where, u denotes a cumulative sample index, $N_p$ denotes the number of accumulated symbols, l denotes a cumulative symbol index, and $N_s$ denotes a symbol interval. $C_{DC}$ denotes a correlation operation model of a dual correlation type for a received signal and may be represented by Equation 2, for example, $$C_{DC}(n) = \quad \text{[Equation 2]}$$
$$\sum_{m=0}^{N_s-1} r^*(n+m)r(n+m-N_D) \cdot s_0(n+m)s_0^*(n+m-N_D) =$$
$$\sum_{m=0}^{N_s-1} s^*(n+m)e^{-(j\omega_0 n+\theta)}s(n+m-N_D)$$
$$e^{j\omega_0(n-N_D)+\theta} \cdot s_0(n+m)s_0(n+m-N_D) = e^{-j\omega_0 N_D}$$
$$\sum_{m=0}^{N_s-1} s^*(n+m)s(n+m-N_D) \cdot s_0(n+m)s_0^*(n+m-N_D)$$

where, m denotes a sample index, $N_S$ denotes a total number of samples per symbol, $N_D$ denotes the number of delay samples to offset an effect of a frequency error, and $S_0$ denotes a 0th symbol included in a preamble. When a peak point of a cumulative correlation is referred to as p, a case in which the sample index u is p in Equation 1 may be represented by Equation 3.

$$C(p) = \sum_{l=0}^{N_p-1} C_{DC}((N_s-1)l + p) \quad \text{[Equation 3]}$$

As illustrated in FIG. 4, an error $\Delta p$ may be present between a peak point p and a real peak point $p_r$ of a cumulative correlation calculated at a sampling interval. To compensate for such an error, the TOA estimating method may use a statistical characteristic of the cumulative correlation.

In the example illustrated in FIG. 4, when the cumulative correlation calculated at a sampling interval is a frequency and a corresponding sampling time is a class mark, the cumulative correlation calculated at a sampling interval may be assumed to be a sample extracted from a normal population with a solid line indicating a population. In this example, by considering a fact that an average of a sample mean is equal to an average of the normal population, the real peak point $p_r$ may be estimated. This may be represented by, for example, Equations 4 to 6, as follows, $$S_C = \sum_{\mu=-m}^{m} C(p+\mu) \quad \text{[Equation 4]}$$

$$S_{CC} = \sum_{\mu=-m}^{m} (p+\mu) \cdot C(p+\mu) \quad \text{[Equation 5]}$$

$$p_r = \frac{S_{CC}}{S_C} = \frac{\sum_{\mu=-m}^{m} (p+\mu) \cdot C(p+\mu)}{\sum_{\mu=-m}^{m} C(p+\mu)} \quad \text{[Equation 6]}$$

where, $S_C$ denotes a total sum of a cumulative correlation, and $S_{CC}$ denotes a cumulative correlation and a corresponding sampling time. In addition, m denotes a size of a window in which an average operation is performed, that is, a size of an average operation interval.

When the real peak point $p_r$ is estimated based on Equation 6 above, the second delay time $T_{pf}$ may be estimated by multiplying, by a sampling period $T_S$, the error $\Delta p$ between the peak point p and the real peak point $p_r$. This may be represented by Equation 7.

$$T_{pf} = \Delta p \cdot T_s = (p - p_r) \cdot T_s \quad [\text{Equation 7}]$$

Figure 5:
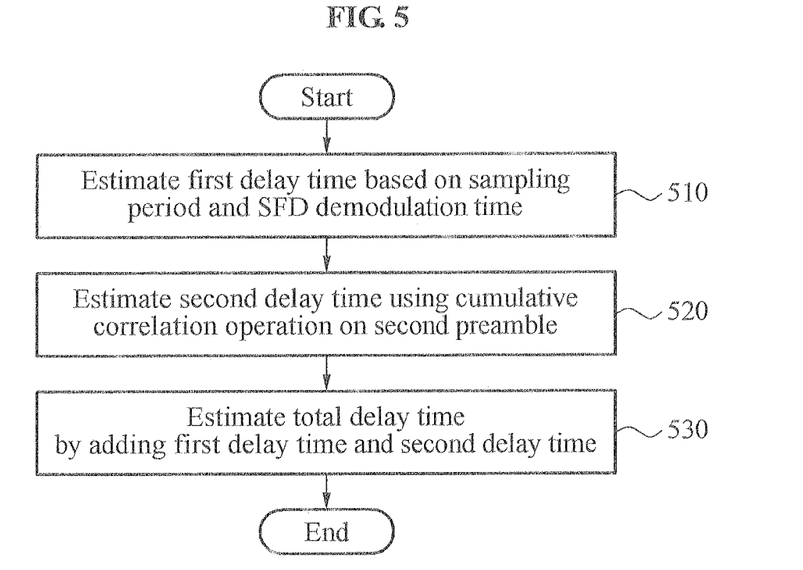
FIG. 5 is a flowchart illustrating an example of a method of estimating TOA according to an example embodiment.

FIG. 5 is a flowchart illustrating an example of a TOA estimating method according to an example embodiment. The TOA estimating method may be performed using a configuration of a packet illustrated in FIG. 2, for example. According to an example embodiment, TOA estimation may be performed at a receiver.

In operation 510, a first delay time $T_{pi}$ corresponding to an integer multiple of a sampling period $T_S$ is estimated. A reception time at which a packet is received may be estimated by subtracting, from an SFD demodulation time at which an SFD is demodulated, a time associated with a symbol length of a first preamble and a symbol length of the SFD. When the reception time of the packet is estimated, an interval between a transmission time at which the packet is transmitted and the estimated reception time may be estimated as the first delay time $T_{pi}$.

Alternatively, the first delay time $T_{pi}$ may be estimated by performing a correlation operation on the received packet. For example, a correlation between the received packet and a reference signal may be calculated, and a time at which the correlation is maximized may be estimated as the reception time of the packet. When the reception time of the packet is estimated, an interval between the transmission time and the estimated reception time may be estimated as the first delay time $T_{pi}$.

In operation 520, a second delay time $T_{pf}$, which is less than the sampling period $T_S$, is estimated. To this end, a second preamble may be defined in the packet. The second delay time $T_{pf}$ may be estimated based on a cumulative correlation calculated by performing a cumulative correlation operation on the second preamble of the received packet.

In operation 530, a total delay time $T_{pt}$ is estimated by adding the first delay time $T_{pi}$ and the second delay time $T_{pf}$. As the second delay time $T_{pf}$, which corresponds to a detailed delay time in a sampling interval, is additionally estimated and applied, it is possible to compensate for an error in the sampling interval that may be resulted from the TOA estimation.

Figure 6:
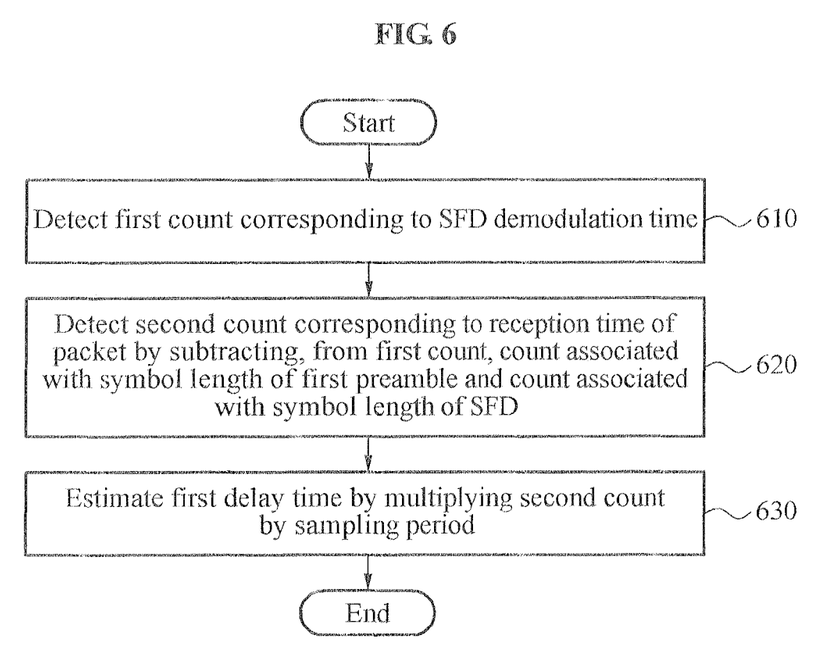
FIG. 6 is a flowchart illustrating an example of a method of estimating TOA according to an example embodiment.

FIG. 6 is a flowchart illustrating an example of a TOA estimating method according to an example embodiment. The TOA estimating method may be performed using a configuration of a packet illustrated in FIG. 2, for example. In the example illustrated in FIG. 6, how to estimate a first delay time $T_{pi}$ will be described in detail.

In operation 610, a first count $N_{SFD}$ corresponding to an SFD demodulation time at which an SFD is demodulated is detected. The first count $N_{SFD}$ may be detected using a count value corresponding to a period from a transmission time at which a transmitter transmits a packet to the SFD demodulation time at which a receiver demodulates the SFD.

In operation 620, a second count $N_C$ corresponding to a reception time at which the packet is received is detected by subtracting, from the first count $N_{SFD}$, a count associated with a symbol length of a first preamble and a count associated with a symbol length of the SFD. For example, in a case in which the symbol length of the first preamble is eight symbols and the symbol length of the SFD is two symbols, the second count $N_C$ may be detected by subtracting, from the first count $N_{SFD}$, a count value corresponding to a length of the ten symbols.

In operation 630, the first delay time $T_{pi}$ is estimated by multiplying the second count $N_C$ by a sampling period $T_S$. The first delay time $T_{pi}$ may be a period corresponding to an integer multiple of the sampling period $T_S$.

Figure 7:
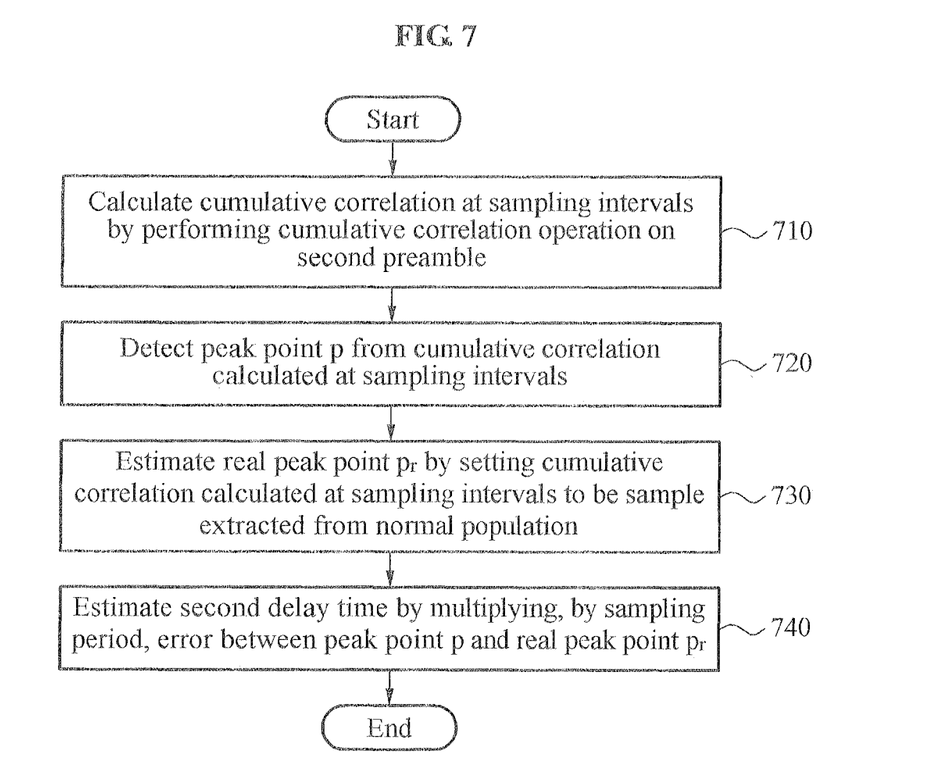
FIG. 7 is a flowchart illustrating an example of a method of estimating TOA according to an example embodiment.

FIG. 7 is a flowchart illustrating an example of a TOA estimating method according to an example embodiment. The TOA estimating method may be performed using a configuration of a packet illustrated in FIG. 2, for example. In the example illustrated in FIG. 7, how to estimate a second delay time $T_{pf}$ will be described in detail.

In operation 710, a cumulative correlation is calculated at a sampling interval by performing a cumulative correlation operation on a second preamble. In detail, the cumulative correlation operation may use a result of accumulating a plurality of symbols at symbol intervals to calculate the cumulative correlation with respect to the second preamble. For example, the cumulative correlation may be calculated using Equation 1 above.

In operation 720, a peak point p at which the calculated cumulative correlation is maximized is detected. However, an error $\Delta p$ may be present between the detected peak point p and a real peak point $p_r$, and it is thus necessary to compensate for such an error using a statistical characteristic of the cumulative correlation.

In operation 730, the real peak point $p_r$ is estimated by setting the cumulative correlation calculated at a sampling interval to be a sample extracted from a normal population. This may be based on a fact that an average of a sample mean is equal to an average of the normal population. Thus, the real peak point $p_r$ may be estimated by dividing a total sum of products of the cumulative correlation and a sampling time by a total sum of the cumulative correlation. For example, the real peak point $p_r$ may be estimated using Equations 4 to 6 above.

An effective wireless communication system-based TOA estimating method is provided as described above. By additionally estimating, in addition to a first delay time estimated as a sampling interval, a second delay time within the sampling interval, and compensating for an error of the first delay time, it is possible to obtain an improved performance of TOA estimation and an improved accuracy in positioning, compared to existing technology.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A method of estimating time of arrival (TOA) of a wireless communication signal, the method comprising:
    receiving, by a receiver, a packet including a first preamble, a second preamble, and a start of frame delimiter (SFD);
    estimating, by the receiver, a first delay time based on an SFD demodulation time at which the SFD is demodulated and on a symbol length of the first preamble; and
    estimating, by the receiver, a second delay time based on a cumulative correlation calculated by performing a cumulative correlation operation on the second preamble; and
    estimating a total delay time by adding the first delay time and the second delay time.

2. The method of claim 1, wherein the estimating of the first delay time comprises:
    detecting a first count corresponding to the SFD demodulation time;
    detecting a second count corresponding to a reception time at which the packet is received by subtracting, from the first count, a count associated with the symbol length of the first preamble and a count associated with a symbol length of the SFD; and
    estimating the first delay time by multiplying the second count by a sampling period.

3. The method of claim 1, wherein the estimating of the second delay time comprises:
    calculating the cumulative correlation using a result of accumulating a plurality of symbols at symbol intervals.

4. The method of claim 1, wherein the estimating of the second delay time comprises:
    estimating an error in a sampling interval using an average operation of the calculated cumulative correlation; and
    estimating the second delay time by multiplying the estimated error by a sampling period.

5. The method of claim 4, wherein the estimating of the error comprises:
    detecting a peak point p at which the calculated cumulative correlation has a maximum value; and
    estimating a real peak point $p_r$ by dividing a sum $S_{cc}$ of products of the cumulative correlation and a sampling time by a sum $S_C$ of the cumulative correlation.

6. The method of claim 5, wherein the real peak point $p_r$ is calculated using an equation, $$p_r = \frac{S_{CC}}{S_C} = \frac{\sum_{\mu=-m}^{m} (p+\mu) \cdot C(p+\mu)}{\sum_{\mu=-m}^{m} C(p+\mu)},$$

wherein m denotes a size of an average operation interval.

7. A non-transitory computer-readable medium comprising a program for instructing a computer to perform the method of claim 1.

8. A method of estimating time of arrival (TOA) of a wireless communication signal, the method comprising:
    receiving, by a receiver, a packet including a first preamble, a second preamble, and a start of frame delimiter (SFD);
    estimating, by the receiver, a first delay time based on an SFD demodulation time at which the SFD is demodulated and on a symbol length of the first preamble; and
    estimating, by the receiver, a second delay time based on a cumulative correlation calculated by performing a cumulative correlation operation on the second preamble; wherein the estimating of the first delay time comprises:
    detecting a first count corresponding to the SFD demodulation time;

detecting a second count corresponding to a reception time at which the packet is received by subtracting, from the first count, a count associated with the symbol length of the first preamble and a count associated with a symbol length of the SFD; and estimating the first delay time by multiplying the second count by a sampling period.

9. The method of claim 8, wherein the estimating of the second delay time comprises:
calculating the cumulative correlation using a result of accumulating a plurality of symbols at symbol intervals.

10. The method of claim 8, wherein the estimating of the second delay time comprises:
estimating an error in a sampling interval using an average operation of the calculated cumulative correlation; and
estimating the second delay time by multiplying the estimated error by a sampling period.

11. The method of claim 10, wherein the estimating of the error comprises:
detecting a peak point p at which the calculated cumulative correlation has a maximum value; and
estimating a real peak point $p_r$ by dividing a sum $S_{cc}$ of products of the cumulative correlation and a sampling time by a sum $S_C$ of the cumulative correlation.

12. The method of claim 11, wherein the real peak point $p_r$ is calculated using an equation, $$p_r = \frac{S_{CC}}{S_C} = \frac{\sum_{\mu=-m}^{m} (p+\mu) \cdot C(p+\mu)}{\sum_{\mu=-m}^{m} C(p+\mu)},$$

wherein m denotes a size of an average operation interval.

13. A non-transitory computer-readable medium comprising a program for instructing a computer to perform the method of claim 8.

14. A method of estimating time of arrival (TOA) of a wireless communication signal, the method comprising:
receiving, by a receiver, a packet including a first preamble, a second preamble, and a start of frame delimiter (SFD);
estimating, by the receiver, a first delay time based on an SFD demodulation time at which the SFD is demodulated and on a symbol length of the first preamble; and
estimating, by the receiver, a second delay time based on a cumulative correlation calculated by performing a cumulative correlation operation on the second preamble; wherein the estimating of the second delay time comprises:
estimating an error in a sampling interval using an average operation of the calculated cumulative correlation; and
estimating the second delay time by multiplying the estimated error by a sampling period.

15. The method of claim 14, wherein the estimating of the error comprises:
detecting a peak point p at which the calculated cumulative correlation has a maximum value; and
estimating a real peak point $p_r$ by dividing a sum $S_{cc}$ of products of the cumulative correlation and a sampling time by a sum $S_C$ of the cumulative correlation.

16. The method of claim 15, wherein the real peak point $p_r$ is calculated using an equation, $$p_r = \frac{S_{CC}}{S_C} = \frac{\sum_{\mu=-m}^{m} (p+\mu) \cdot C(p+\mu)}{\sum_{\mu=-m}^{m} C(p+\mu)},$$

wherein m denotes a size of an average operation interval.

17. A non-transitory computer-readable medium comprising a program for instructing a computer to perform the method of claim 14.

* * * * *